(No Model.)
G. MAGNUSSAN.
EXTENSION TABLE.
No. 451,597. Patented May 5, 1891.
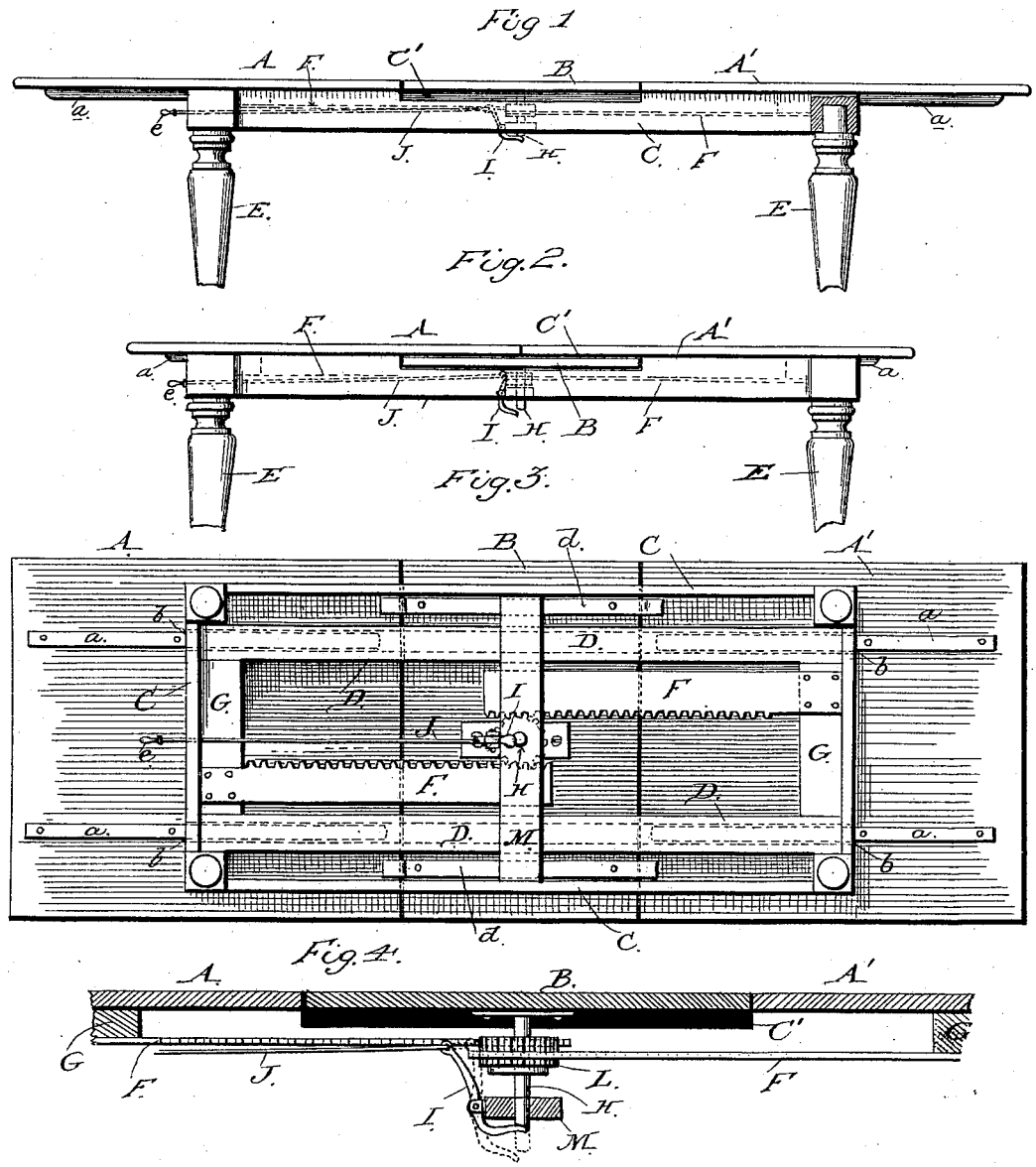
WITNESSES
L. E. Harris
L. M. Thomas.
INVENTOR.
Gust Magnussan
per M. Harris
Attorney

UNITED STATES PATENT OFFICE.

GUST MAGNUSSAN, OF JAMESTOWN, NEW YORK.

EXTENSION-TABLE.

SPECIFICATION forming part of Letters Patent No. 451,597, dated May 5, 1891.

Application filed May 26, 1890. Serial No. 353,139. (No model.)

*To all whom it may concern:*

Be it known that I, GUST MAGNUSSAN, a citizen of the United States, residing at Jamestown, in the county of Chautauqua and State of New York, have invented certain new and useful Improvements in Extension-Tables; and I do hereby declare the following to be a full, clear, and exact description of the invention, such as will enable others skilled in the art to which it appertains to make and use the same.

The object of my invention is to make a simple, strong, and durable extension-table, and one in which all the parts are together; and the improvement consists in the mechanism for extending the top leaves and elevating the center leaf into position and returning the same to its closed position, all of which will be fully understood by this specification and the accompanying drawings, in which—

Figure 1 is a side elevation showing table extended and center section elevated. Fig. 2 is a side elevation with the center section lowered. Fig. 3 is a bottom plan view. Fig. 4 is an enlarged sectional view of the center section, showing the means of raising and lowering the same.

In the drawings, C C represent the rails of a table-frame secured to square corner-blocks at each end, as shown in Fig. 3, said corner-blocks having holes to receive a movable leg, as shown in Fig. 1.

A and A' represent the main leaves of the table, having dovetailed cleats *a a* secured to their under sides and running in suitable grooves *b b*, cut in the upper side of the long pieces D D.

M is a cross-rail situated at the center of the table and being rigidly secured to the side rails C C near their lower edges and having a hole through its center, through which the spindle H passes, said spindle being secured to the bottom of the movable leaf B and carrying a pinion L. The metal rack-bars F F are firmly secured at their rear ends to cross-pieces G G, as shown in Fig. 3.

I is a crooked lever hinged to cross-rail M, its lower end made to come in contact with the end of spindle H, its upper end having an eye to receive rod J, which passes through the end rail C and has a handle *e*, as shown. Cleats *d d* are secured to the center leaf to prevent it going too high.

The operation is as follows: By drawing one of the leaves the rack F of such leaf causes the pinion to rotate, and this causes the rack on the other leaf to travel the same distance, thus moving out both leaves in opposite directions, and when thus drawn out by drawing on handle *e* of rod J the end of lever I comes in contact with the spindle, which is raised, carrying the center leaf up to the line of the two main leaves, and by pushing on the main leaf pins on the center leaf engage the holes in the other leaves and the table is held strong for service. By reversing the process the center leaf can be instantly lowered to its place and the table closed up again.

The table may be of any suitable form or material.

I claim—

1. In extension-tables, the main leaves A and A', provided with means to secure them to the top of the table-frame, said leaves having rack-bars on their under sides, and a vertical pinion between said racks, in combination with a center leaf held by a spindle passing through the pinion, the spindle being provided with a crooked lever or other suitable device for elevating the center leaf into line, substantially as and for the purpose set forth.

2. In extension-tables, the movable leaves A and A', having dovetailed cleats *a a* running in grooves *b b*, rack-bars F F being secured to their under sides, in combination with leaf B, spindle H, pinion L, lever I, and rod J, all arranged to operate in the manner and for the purpose shown.

In testimony whereof I affix my signature in presence of two witnesses.

GUST MAGNUSSAN.

Witnesses:
 MILO HARRIS,
 S. D. CHASE.